United States Patent
Martin et al.

(10) Patent No.: US 12,042,056 B2
(45) Date of Patent: Jul. 23, 2024

(54) MATTRESS COVER AND RELATED METHOD

(71) Applicant: Precision Textiles LLC, Fairfield, NJ (US)

(72) Inventors: Christopher Keith Martin, Wayne, NJ (US); Garrett Graven, Fairfield, NJ (US)

(73) Assignee: PRECISION TEXTILES LLC, Fairfield, NJ (US)

( * ) Notice: Subject to any disclaimer, the term of this patent is extended or adjusted under 35 U.S.C. 154(b) by 0 days.

(21) Appl. No.: 18/598,758

(22) Filed: Mar. 7, 2024

(65) Prior Publication Data

US 2024/0206642 A1    Jun. 27, 2024

Related U.S. Application Data

(63) Continuation-in-part of application No. 18/221,205, filed on Jul. 12, 2023.

(60) Provisional application No. 63/388,369, filed on Jul. 12, 2022.

(51) Int. Cl.
A47C 31/00 (2006.01)
A47C 27/00 (2006.01)
B32B 5/02 (2006.01)
B32B 5/06 (2006.01)

(52) U.S. Cl.
CPC .......... *A47C 31/001* (2013.01); *A47C 27/002* (2013.01); *B32B 5/024* (2013.01); *B32B 5/026* (2013.01); *B32B 5/073* (2021.05); *B32B 2250/03* (2013.01); *B32B 2307/3065* (2013.01); *B32B 2479/00* (2013.01)

(58) Field of Classification Search
CPC ....... A47C 31/00; A47C 31/001; A47C 27/00; A47C 27/002; B32B 5/024; B32B 5/026; B32B 5/073; B32B 2250/03; B32B 2307/3065; B32B 2479/00
See application file for complete search history.

(56) References Cited

U.S. PATENT DOCUMENTS

| | | |
|---|---|---|
| 2,027,296 A | 1/1936 | Stuart et al. |
| 3,934,285 A | 1/1976 | May |
| 4,230,746 A | 10/1980 | Nahta |
| 4,495,238 A | 1/1985 | Adiletta |
| 4,555,811 A | 12/1985 | Shimalla |
| 5,007,123 A | 4/1991 | Salyards |
| 5,011,731 A | 4/1991 | Nakamori et al. |
| 5,496,623 A | 3/1996 | Fox |
| 6,103,360 A | 8/2000 | Caldwell et al. |
| 6,277,469 B1 | 8/2001 | Wildeman |

(Continued)

OTHER PUBLICATIONS

Inherently Flame Retardant and Resistant Fibres, CIRFS, European Man-Made Fibres Association, http://www.cirfs.Jrg, Sep. 16, 2018, 12 pages.

(Continued)

*Primary Examiner* — Fredrick C Conley
(74) *Attorney, Agent, or Firm* — Greenberg Traurig, LLP

(57) ABSTRACT

A mattress cover includes a first, face layer, a second, back layer, and third, inlay layer between the face layer and the back layer. The inlay layer is composed of a flame-retardant material. The face layer is attached to the back layer. The inlay layer is not attached to the face layer and the back layer.

20 Claims, 2 Drawing Sheets

(56) References Cited

U.S. PATENT DOCUMENTS

| | | | |
|---|---|---|---|
| 6,423,393 | B1 | 7/2002 | Wildeman |
| 6,492,574 | B1 | 12/2002 | Chen et al. |
| 6,562,434 | B1 | 5/2003 | Wildeman |
| 6,669,882 | B2 | 12/2003 | Seok |
| 6,855,392 | B2 | 2/2005 | Wildeman et al. |
| 6,893,492 | B2 | 5/2005 | White et al. |
| 7,225,487 | B2 | 6/2007 | Small, Jr. et al. |
| 7,365,032 | B1 | 4/2008 | Adachi et al. |
| 7,473,659 | B2 | 1/2009 | Sytz |
| 7,484,256 | B2 * | 2/2009 | Murphy ............... A47C 31/001 428/920 |
| 7,638,192 | B2 | 12/2009 | Murphy et al. |
| 7,827,637 | B2 * | 11/2010 | DeFranks ............ A47C 27/005 5/954 |
| 7,858,542 | B2 | 12/2010 | Mio et al. |
| 7,981,819 | B2 | 7/2011 | Ahluwalia |
| 8,236,712 | B2 | 8/2012 | Jones et al. |
| 8,367,203 | B2 | 2/2013 | Ruf et al. |
| 8,703,631 | B2 | 4/2014 | Sytz |
| 9,187,851 | B2 | 11/2015 | Wildeman et al. |
| 9,357,863 | B1 | 6/2016 | Goenka |
| 9,469,935 | B1 | 10/2016 | Martin et al. |
| 2003/0206979 | A1 | 11/2003 | Dvoracek et al. |
| 2004/0033352 | A1 | 2/2004 | Massa et al. |
| 2004/0068802 | A1 | 4/2004 | Miller et al. |
| 2004/0097156 | A1 | 5/2004 | McGuire et al. |
| 2004/0102112 | A1 | 5/2004 | McGuire et al. |
| 2004/0106347 | A1 | 5/2004 | McGuire et al. |
| 2004/0121114 | A1 | 6/2004 | Piana et al. |
| 2004/0172754 | A1 | 9/2004 | Brooks et al. |
| 2004/0185731 | A1 | 9/2004 | McGuire |
| 2004/0226100 | A1 | 11/2004 | Small, Jr. et al. |
| 2004/0241346 | A1 | 12/2004 | Hanaoka et al. |
| 2005/0118912 | A1 | 6/2005 | Tslarkezos et al. |
| 2005/0130544 | A1 | 6/2005 | Cheng et al. |
| 2005/0164582 | A1 | 7/2005 | McGuire et al. |
| 2005/0233660 | A1 | 10/2005 | Kimbrell et al. |
| 2005/0245164 | A1 | 11/2005 | Aneja et al. |
| 2005/0282018 | A1 | 12/2005 | Van Den Bergen et al. |
| 2006/0000024 | A1 | 1/2006 | McGuire et al. |
| 2006/0046028 | A1 | 3/2006 | Kaminski et al. |
| 2006/0116043 | A1 | 6/2006 | Hope et al. |
| 2006/0162088 | A1 | 7/2006 | Daly |
| 2007/0251276 | A1 | 11/2007 | D'Ottavioano et al. |
| 2007/0283493 | A1 * | 12/2007 | Link ....................... D04H 1/46 5/954 |
| 2007/0298668 | A1 | 12/2007 | DeFranks |
| 2008/0050565 | A1 | 2/2008 | Gross et al. |
| 2008/0085651 | A1 | 4/2008 | Handermann et al. |
| 2008/0134444 | A1 | 6/2008 | Greenspoon |
| 2008/0149903 | A1 | 6/2008 | Murphy et al. |
| 2008/0153975 | A1 | 6/2008 | Lubnin |
| 2009/0311933 | A1 | 12/2009 | Mihoichi et al. |
| 2010/0035054 | A1 | 2/2010 | White |
| 2012/0102657 | A1 | 5/2012 | Wilderman |
| 2012/0258643 | A1 | 10/2012 | Ruf et al. |
| 2012/0295031 | A1 | 11/2012 | Grunlan |
| 2013/0014672 | A1 | 1/2013 | Martin et al. |
| 2015/0337204 | A1 | 11/2015 | Yamazaki et al. |
| 2017/0022658 | A1 | 1/2017 | Fang et al. |

OTHER PUBLICATIONS

Tietex International Ltd., Stitchbond Nonwoven Technology, website, URL: http://tietex.com/stitchbonding/, 3 pages.
http://dictionary.reference.com/browse/sew?s=I, 11 pages.
Suskind, Polyurethane Latex, Journal of Applied Polymer Science, vol. 9, pp. 2451-2459 (1965).

* cited by examiner

MATTRESS COVER AND RELATED METHOD

CROSS-REFERENCE TO RELATED APPLICATION

The present application is a continuation-in-part of U.S. application Ser. No. 18/221,205, filed Jul. 12, 2023, entitled "Mattress Cover and Related Method, which claims priority to and the benefit of U.S. Provisional Patent Application Ser. No. 63/388,369, filed on Jul. 12, 2022, the disclosure of each which is incorporated by reference herein in its entirety.

FIELD OF THE INVENTION

The present invention relates to a flame-retardant fabric used in bedding and/or a sleep product, such as a mattress, and, more specifically, to a flame-retardant cover for a mattress.

BACKGROUND

Each year in the United States, the ignition of mattresses in private residences and overnight accommodations results in hundreds of deaths as well as hundreds of millions of dollars in property losses. Heightened awareness of fire prevention has led to the development of standards and regulations directed to reducing the likelihood that such fires will occur. Using flame resistant fabrics as flame barriers in bedding and sleep products, including mattresses, reduces the likelihood of fires.

SUMMARY

The Claims, rather than the Summary, define the covered embodiments of the present invention. The Summary is a high-level overview of various aspects of the invention and introduces some concepts that are further described in the Detailed Description below. The Summary is not intended to identify key or essential features of the claimed subject matter and is not intended to be used in isolation to determine the scope of the claimed subject matter. Instead, the claimed subject matter should be understood by reference to appropriate portions of the Specification and drawings, as well as to each claim.

In some embodiments, a mattress cover includes a first layer; a second layer; and an inlay layer, wherein the inlay layer is between the first layer and the second layer, wherein the inlay layer is composed of a flame-retardant material, wherein the first layer is attached to the second layer, and wherein the inlay layer is not attached to the first layer and the second layer.

In some embodiments, the first layer is a back layer, wherein the second layer is a face layer, and wherein the back layer is configured to be located closer to a mattress core covered by the mattress cover than the inlay layer and the face layer. In some embodiments, the face layer is an outermost layer of the mattress cover. In some embodiments, the inlay layer is composed of one or more of a cellulosic yarn, rayon yarn, viscose filament yarn, polyester, polypropylene, fire retardant poly, acrylic, nylon, synthetic bulking yarns, or combinations or blends thereof. In some embodiments, the flame-retardant material comprises at least one of a continuous flame-retardant viscose staple fiber (FRVSF) or a micro-flame-retardant-viscose (micro-FRV) yarn. In some embodiments, the flame-retardant material has a limiting oxygen index (LOI) from 14 to 45. In some embodiments, at least one of the face layer and the back layer comprises at least one of a knit fabric material or a woven fabric material. In some embodiments, each of the face layer and the back layer is composed of one or more of cotton, bamboo, rayon, polyester, nylon, modal fabric, lyocell, polypropylene, low-density polyethylene, high-density polyethylene, ultra-high density polyethylene, or combinations or blends thereof.

In some embodiments, a mattress assembly includes a core; and mattress cover, wherein the mattress cover covers at least a portion of the core, wherein the mattress cover includes a first layer, a second layer, and an inlay layer, wherein the inlay layer is between the first layer and the second layer, wherein the inlay layer is composed of a flame-retardant material, wherein the first layer is attached to the second layer, and wherein the inlay layer is not attached to the first layer and the second layer.

In some embodiments, the first layer is a back layer, wherein the second layer is a face layer, and wherein the back layer is configured to be located closer to the core than the inlay layer and the face layer. In some embodiments, the face layer is an outermost layer of the mattress cover. In some embodiments, the inlay layer is composed of one or more of a cellulosic yarn, rayon yarn, viscose filament yarn, polyester, polypropylene, fire retardant poly, acrylic, nylon, synthetic bulking yarns, or combinations or blends thereof. In some embodiments, the flame-retardant material comprises at least one of a continuous flame-retardant viscose staple fiber (FRVSF) or a micro-flame-retardant-viscose (micro-FRV) yarn. In some embodiments, the flame-retardant material has a limiting oxygen index (LOI) from 14 to 45.

In some embodiments, at least one of the face layer and the back layer comprises at least one of a knit fabric material or a woven fabric material. In some embodiments, each of the face layer and the back layer is composed of one or more of cotton, bamboo, rayon, polyester, nylon, modal fabric, lyocell, polypropylene, low-density polyethylene, high-density polyethylene, ultra-high density polyethylene, or combinations or blends thereof. In some embodiments, the core is composed of foam. In some embodiments, the back layer contacts the core. In some embodiments, the face layer is stitched to the back layer, and wherein the inlay layer is not stitched to the face layer and the back layer.

In some embodiments, a bedding product includes a core; and a cover, wherein the cover covers at least a portion of the core, wherein the cover includes a face layer, a back layer, and an inlay layer, wherein the inlay layer is between the face layer and the back layer, wherein the inlay layer is composed of a flame-retardant material, wherein the face layer is attached to the back layer, and wherein the inlay layer is not attached to the face layer and the back layer, and wherein the back layer is located closer to the core than the inlay layer and the face layer.

BRIEF DESCRIPTION OF THE DRAWINGS

For a more complete understanding of the present invention, reference is made to the following detailed description of exemplary embodiments considered in conjunction with the accompanying drawings, which are presented for the purpose of illustration rather than being drawn to scale, and in which.

DETAILED DESCRIPTION

Figure 1:
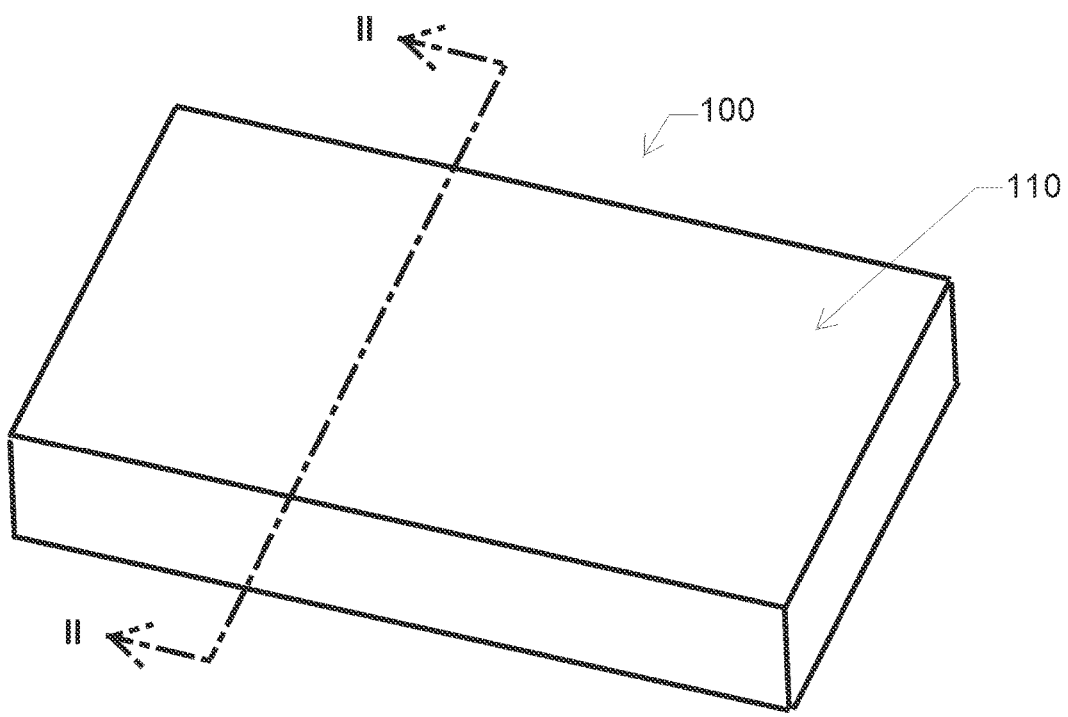
FIG. 1 is an isometric view of some embodiments of a mattress assembly, including a mattress cover covering a mattress core.

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

In some embodiments, a flame-retardant mattress cover includes a first, face layer, a second, back layer, and third, inlay layer (inner layer) disposed between the face layer and the back layer. In some embodiments, the inlay layer is composed of a non-knit material. In some embodiments, the inlay layer is composed of a flame-retardant material. In some embodiments, the inlay layer is composed of a non-knit flame-retardant material. In some embodiments, the inlay layer is composed of an inherently flame-retardant material. In some embodiments, the inherently flame-retardant material is a cellulosic yarn. In some embodiments, the inherently flame-retardant material is a rayon yarn. In some embodiments, the material of the inlay layer includes silicate as a flame-retardant agent.

In some embodiments, the inlay layer includes several loose yarns. In some embodiments, the loose yarns are 2 inches in length. In some embodiments, the loose yarns are more than 2 inches in length. In some embodiments, the loose yarns are less than 2 inches in length. In some embodiments, the loose yarns are 0.5 inch in length. In some embodiments, the loose yarns are 1 inch in length. In some embodiments, the loose yarns are 1.5 inches in length. In some embodiments, the loose yarns are 2 inches in length. In some embodiments, the loose yarns are 2.5 inches in length. In some embodiments, the loose yarns are 3 inches in length.

In some embodiments, the loose yarns are more than 0.5 inches in length. In some embodiments, the loose yarns are more than 1 inch in length. In some embodiments, the loose yarns are more than 1.5 inches in length. In some embodiments, the loose yarns are more than 2 inches in length. In some embodiments, the loose yarns are more than 2.5 inches in length. In some embodiments, the loose yarns are more than 3 inches in length. In some embodiments, the loose yarns are less than 0.5 inches in length. In some embodiments, the loose yarns are less than 1 inch in length. In some embodiments, the loose yarns are less than 1.5 inches in length. In some embodiments, the loose yarns are less than 2 inches in length. In some embodiments, the loose yarns are less than 2.5 inches in length. In some embodiments, the loose yarns are less than 3 inches in length.

In some embodiments, the loose yarns are 0.5 inches in length to 3 inches in length. In some embodiments, the loose yarns are 1 inch in length to 3 inches in length. In some embodiments, the loose yarns are 1.5 inches in length to 3 inches in length. In some embodiments, the loose yarns are 2 inches in length to 3 inches in length. In some embodiments, the loose yarns are 2.5 inches in length to 3 inches in length. In some embodiments, the loose yarns are 0.5 inches in length to 2.5 inches in length. In some embodiments, the loose yarns are 1 inch in length to 2.5 inches in length. In some embodiments, the loose yarns are 1.5 inches in length to 2.5 inches in length. In some embodiments, the loose yarns are 2 inches in length to 2.5 inches in length.

In some embodiments, the loose yarns are 0.5 inches in length to 2 inches in length. In some embodiments, the loose yarns are 1 inch in length to 2 inches in length. In some embodiments, the loose yarns are 1.5 inches in length to 2 inches in length. In some embodiments, the loose yarns are 0.5 inches in length to 1.5 inches in length. In some embodiments, the loose yarns are 1 inch in length to 1.5 inches in length. In some embodiments, the loose yarns are 0.5 inches in length to 1 inch in length.

In some embodiments, processing of the inherently flame-retardant material provides bulk. In some embodiments, bulk includes imparting a three-dimensional aspect to a top surface. In some embodiments, processing of the inherently flame-retardant material provides elongation. In some embodiments, elongation includes assistance with stretch, recovery, or both stretch and recovery of the fabric. In some embodiments, processing of the inherently flame-retardant material provides bulk and elongation.

In some embodiments, the material of the inlay layer is a continuous flame-retardant viscose staple fiber (FRVSF). In some embodiments, the material of the inlay layer undergoes application of one or more drawn textured yarn (DTY) techniques.

In some embodiments, the material of the inlay layer is a viscose filament yarn (VFY). In some embodiments, processing of the VFY includes adding a flame-retardant substance into a purified and/or liquid cellulose material, prior to the material going through a spinneret. In some embodiments, the material then undergoes application of DTY techniques. In some embodiments, the material of the inlay layer is a micro-flame-retardant-viscose (micro-FRV) yarn.

In some embodiments, the material of the inlay layer undergoes processing with heat. In some embodiments, the material of the inlay layer undergoes processing with water. In some embodiments, the material of the inlay layer undergoes processing with air. In some embodiments, the material of the inlay layer undergoes processing with more than one of heat, water, and/or air. In some embodiments, the material of the inlay layer undergoes water texturing. In some embodiments, the water-textured material of the inlay layer includes one or more of FRVSF, VFY, and/or micro-FRV yarn.

In some embodiments, the material of the inlay layer is a 600 denier, 90 filament yarn. In some embodiments, the material of the inlay layer includes two (2) plies of 600 denier, 90 filament yarn. In some embodiments, the texturing is air texturing. In some embodiments, the texturing is water texturing.

In some embodiments, the material of the inlay layer is a 400 denier yarn. In some embodiments, the material of the inlay layer is a 450 denier yarn. In some embodiments, the material of the inlay layer is a 500 denier yarn. In some embodiments, the material of the inlay layer is a 550 denier yarn. In some embodiments, the material of the inlay layer is a 600 denier yarn. In some embodiments, the material of the inlay layer is a 650 denier yarn. In some embodiments, the material of the inlay layer is a 700 denier yarn. In some embodiments, the material of the inlay layer is a 750 denier yarn. In some embodiments, the material of the inlay layer is an 800 denier yarn.

In some embodiments, the material of the inlay layer is a yarn with a denier value that is less than 400 denier. In some embodiments, the material of the inlay layer is a yarn with a denier value that is less than 450 denier. In some embodiments, the material of the inlay layer is a yarn with a denier value that is less than 500 denier. In some embodiments, the material of the inlay layer is a yarn with a denier value that is less than 550 denier. In some embodiments, the material of the inlay layer is a yarn with a denier value that is less than 600 denier. In some embodiments, the material of the inlay layer is a yarn with a denier value that is less than 650 denier. In some embodiments, the material of the inlay layer is a yarn with a denier value that is less than 700 denier. In some embodiments, the material of the inlay layer is a yarn with a denier value that is less than 750 denier. In some embodiments, the material of the inlay layer is a yarn with a denier value that is less than 800 denier.

In some embodiments, the material of the inlay layer is a yarn with a denier value that is more than 400 denier. In some embodiments, the material of the inlay layer is a yarn with a denier value that is more than 450 denier. In some embodiments, the material of the inlay layer is a yarn with a denier value that is more than 500 denier. In some embodiments, the material of the inlay layer is a yarn with a denier value that is more than 550 denier. In some embodiments, the material of the inlay layer is a yarn with a denier value that is more than 600 denier. In some embodiments, the material of the inlay layer is a yarn with a denier value that is more than 650 denier. In some embodiments, the material of the inlay layer is a yarn with a denier value that is more than 700 denier. In some embodiments, the material of the inlay layer is a yarn with a denier value that is more than 750 denier. In some embodiments, the material of the inlay layer is a yarn with a denier value that is more than 800 denier.

In some embodiments, the material of the inlay layer is a 400 denier yarn to an 800 denier yarn. In some embodiments, the material of the inlay layer is a 450 denier yarn to an 800 denier yarn. In some embodiments, the material of the inlay layer is a 500 denier yarn to an 800 denier yarn. In some embodiments, the material of the inlay layer is a 550 denier yarn to an 800 denier yarn. In some embodiments, the material of the inlay layer is a 600 denier yarn to an 800 denier yarn. In some embodiments, the material of the inlay layer is a 650 denier yarn to an 800 denier yarn. In some embodiments, the material of the inlay layer is a 700 denier yarn to an 800 denier yarn. In some embodiments, the material of the inlay layer is a 750 denier yarn to an 800 denier yarn.

In some embodiments, the material of the inlay layer is a 400 denier yarn to a 750 denier yarn. In some embodiments, the material of the inlay layer is a 450 denier yarn to a 750 denier yarn. In some embodiments, the material of the inlay layer is a 500 denier yarn to a 750 denier yarn. In some embodiments, the material of the inlay layer is a 550 denier yarn to a 750 denier yarn. In some embodiments, the material of the inlay layer is a 600 denier yarn to a 750 denier yarn. In some embodiments, the material of the inlay layer is a 650 denier yarn to a 750 denier yarn. In some embodiments, the material of the inlay layer is a 700 denier yarn to a 750 denier yarn.

In some embodiments, the material of the inlay layer is a 400 denier yarn to a 700 denier yarn. In some embodiments, the material of the inlay layer is a 450 denier yarn to a 700 denier yarn. In some embodiments, the material of the inlay layer is a 500 denier yarn to a 700 denier yarn. In some embodiments, the material of the inlay layer is a 550 denier yarn to a 700 denier yarn. In some embodiments, the material of the inlay layer is a 600 denier yarn to a 700 denier yarn. In some embodiments, the material of the inlay layer is a 650 denier yarn to a 700 denier yarn.

In some embodiments, the material of the inlay layer is a 400 denier yarn to a 650 denier yarn. In some embodiments, the material of the inlay layer is a 450 denier yarn to a 650 denier yarn. In some embodiments, the material of the inlay layer is a 500 denier yarn to a 650 denier yarn. In some embodiments, the material of the inlay layer is a 550 denier yarn to a 650 denier yarn. In some embodiments, the material of the inlay layer is a 600 denier yarn to a 650 denier yarn.

In some embodiments, the material of the inlay layer is a 400 denier yarn to a 600 denier yarn. In some embodiments, the material of the inlay layer is a 450 denier yarn to a 600 denier yarn. In some embodiments, the material of the inlay layer is a 500 denier yarn to a 600 denier yarn. In some embodiments, the material of the inlay layer is a 550 denier yarn to a 600 denier yarn. In some embodiments, the material of the inlay layer is a 400 denier yarn to a 550 denier yarn. In some embodiments, the material of the inlay layer is a 450 denier yarn to a 550 denier yarn. In some embodiments, the material of the inlay layer is a 500 denier yarn to a 550 denier yarn. In some embodiments, the material of the inlay layer is a 400 denier yarn to a 500 denier yarn. In some embodiments, the material of the inlay layer is a 450 denier yarn to a 500 denier yarn. In some embodiments, the material of the inlay layer is a 400 denier yarn to a 450 denier yarn.

In some embodiments, the material of the inlay has a limiting oxygen index (LOI) from 14 to 45. In some embodiments, the material of the inlay has an LOI from 28 to 30. In some embodiments, the material of the inlay has an LOI of at least 25. In some embodiments, the material of the inlay has an LOI of 25. In some embodiments, the material of the inlay has an LOI of 14. In some embodiments, the material of the inlay has an LOI of 15. In some embodiments, the material of the inlay has an LOI of 20. In some embodiments, the material of the inlay has an LOI of 25. In some embodiments, the material of the inlay has an LOI of 30. In some embodiments, the material of the inlay has an LOI of 35. In some embodiments, the material of the inlay has an LOI of 40. In some embodiments, the material of the inlay has an LOI of 45. In some embodiments, the material of the inlay has an LOI of 50.

In some embodiments, the material of more than the inlay has an LOI of more than 14. In some embodiments, the material of more than the inlay has an LOI of more than 15. In some embodiments, the material of more than the inlay has an LOI of more than 20. In some embodiments, the material of more than the inlay has an LOI of more than 25. In some embodiments, the material of more than the inlay has an LOI of more than 30. In some embodiments, the material of more than the inlay has an LOI of more than 35. In some embodiments, the material of more than the inlay has an LOI of more than 40. In some embodiments, the material of more than the inlay has an LOI of more than 45. In some embodiments, the material of more than the inlay has an LOI of more than 50.

In some embodiments, the material of less than the inlay has an LOI of less than 14. In some embodiments, the material of less than the inlay has an LOI of less than 15. In some embodiments, the material of less than the inlay has an LOI of less than 20. In some embodiments, the material of less than the inlay has an LOI of less than 25. In some embodiments, the material of less than the inlay has an LOI of less than 30. In some embodiments, the material of less than the inlay has an LOI of less than 35. In some embodiments, the material of less than the inlay has an LOI of less than 40. In some embodiments, the material of less than the inlay has an LOI of less than 45. In some embodiments, the material of less than the inlay has an LOI of less than 50.

In some embodiments, the material of the inlay has an LOI of 14 to 50. In some embodiments, the material of the inlay has an LOI of 15 to 50. In some embodiments, the material of the inlay has an LOI of 20 to 50. In some embodiments, the material of the inlay has an LOI of 25 to 50. In some embodiments, the material of the inlay has an LOI of 30 to 50. In some embodiments, the material of the inlay has an LOI of 35 to 50. In some embodiments, the material of the inlay has an LOI of 40 to 50. In some embodiments, the material of the inlay has an LOI of 45 to 50.

In some embodiments, the material of the inlay has an LOI of 14 to 45. In some embodiments, the material of the inlay has an LOI of 15 to 45. In some embodiments, the material of the inlay has an LOI of 20 to 45. In some embodiments, the material of the inlay has an LOI of 25 to 45. In some embodiments, the material of the inlay has an LOI of 30 to 45. In some embodiments, the material of the inlay has an LOI of 35 to 45. In some embodiments, the material of the inlay has an LOI of 40 to 45. In some embodiments, the material of the inlay has an LOI of 14 to 40. In some embodiments, the material of the inlay has an LOI of 15 to 40. In some embodiments, the material of the inlay has an LOI of 20 to 40. In some embodiments, the material of the inlay has an LOI of 25 to 40. In some embodiments, the material of the inlay has an LOI of 30 to 40. In some embodiments, the material of the inlay has an LOI of 35 to 40.

In some embodiments, the material of the inlay has an LOI of 14 to 35. In some embodiments, the material of the inlay has an LOI of 15 to 35. In some embodiments, the material of the inlay has an LOI of 20 to 35. In some embodiments, the material of the inlay has an LOI of 25 to 35. In some embodiments, the material of the inlay has an LOI of 30 to 35. In some embodiments, the material of the inlay has an LOI of 14 to 30. In some embodiments, the material of the inlay has an LOI of 15 to 30. In some embodiments, the material of the inlay has an LOI of 20 to 30. In some embodiments, the material of the inlay has an LOI of 25 to 30. In some embodiments, the material of the inlay has an LOI of 14 to 25. In some embodiments, the material of the inlay has an LOI of 15 to 25. In some embodiments, the material of the inlay has an LOI of 20 to 25. In some embodiments, the material of the inlay has an LOI of 14 to 20. In some embodiments, the material of the inlay has an LOI of 15 to 20. In some embodiments, the material of the inlay has an LOI of 14 to 15.

In some embodiments, the inlay layer conforms to a flame-retardancy standard that does not exceed a maximum heat release rate of 200 kW with a total heat release of 15 Mj (megajoules), thereby meeting the requirements of CPSC 16 CFR 1633 testing methodology that is applied to mattresses.

In some embodiments, the inlay layer prevents ignition of the mattress exposed to an open flame for one minute or less. In some embodiments, the inlay layer prevents ignition of the mattress exposed to an open flame for more than one minute In some embodiments, the inlay layer excludes a polyester yarn. In some embodiments, the inlay layer provides similar elongation and bulk as a polyester yarn. In some embodiments, the inlay layer is composed of polyester. In some embodiments, the inlay layer is composed of polypropylene. In some embodiments, the inlay layer is composed of a fire retardant (FR) polymer (poly). In some embodiments, the inlay layer is composed of acrylic. In some embodiments, the inlay layer is composed of nylon. In some embodiments, the inlay layer is composed of synthetic bulking yarns. As used herein, the term "bulking yarn" means a yarn subjected to a bulking process for increasing a thickness and/or loftiness of the yarns or fibers, resulting in enhanced insulation properties, warmth, and/or softer feels. In some embodiments, the bulking process of the synthetic yarns includes mechanical, thermal, or chemical treatments. In some embodiments, the bulking process includes air entanglement and may include passing the yarn through a turbulent air stream to cause the fibers to tangle and interlock and create a three-dimensional structure and increasing the thickness of the yarn. In some embodiments, the bulking process includes heat-setting for crimping the fibers or yarns. In some embodiments, the chemical treatment includes a blooming process for applying chemical agents for causing the fibers or yarns to swell and increase their thickness.

In some embodiments, at least one of the face layer and the back layer is composed of a knit fabric material. In some embodiments, both the face layer and the back layer are composed of a knit fabric material. In some embodiments, the face layer and the back layer are knit together. In some embodiments, the face layer and the back layer are stitched together. In some embodiments, the face layer is not knit, stitched, or attached to the inlay layer. In some embodiments, the back layer is not knit, stitched, or attached to the inlay layer. In some embodiments, the back layer and the face layer are not knit, stitched, or attached to the inlay layer. In some embodiments, the face layer and the back layer encapsulates the inlay layer. In some embodiments, the terms "encapsulating" and "encapsulates" mean to partially or fully envelope or enclose, and with respect to certain embodiments of the mattress cover, the inlay layer is fully enveloped by or enclosed within or between the face layer and the back layer, or partially enveloped by or enclosed within or between the face layer and the back layer.

In some embodiments, at least one of the face layer and the back layer is composed of a woven fabric material. In some embodiments, both the face layer and the back layer are composed of a woven fabric material. In some embodiments, both the face layer and the back layer are woven together. In some embodiments, the face layer is not woven with the inlay layer. In some embodiments, the back layer is not woven with the inlay layer. In some embodiments, the face layer and the back layer are not woven with the inlay layer.

In some embodiments, at least one of the face layer and the back layer is not composed of a flame-retardant and/or flame-resistant material. In some embodiments, both the face layer and the back layer are not composed of a flame-retardant and/or flame-resistant material.

In some embodiments, the face layer is composed of cotton. In some embodiments, the face layer is composed of bamboo. In some embodiments, the face layer is composed of rayon. In some embodiments, the face layer is composed of polyester. In some embodiments, the face layer is composed of nylon. In some embodiments, the face layer is composed of modal fabric. In some embodiments, the face layer is composed of lyocell semi-synthetic fibers. In some embodiments, the lyocell fibers are Tencel® brand of fibers. In some embodiments, the face layer is composed of micromodal/lyocell. In some embodiments, the face layer is composed of polypropylene. In some embodiments, the face layer is composed of low density polyethylene. In some embodiments, the face layer is composed of high density polyethylene. In some embodiments, the face layer is composed of ultrahigh molecular weight polyethylene. In some embodiments, the face layer is composed of a fire retardant (FR) polymer (poly). In some embodiments, the face layer is composed of polymer/cotton. In some embodiments, the face layer is composed of bamboo/cotton. In some embodiments, the face layer is composed of polymer/bamboo. In some embodiments, the face layer is composed of lyocell/polymer. In some embodiments, the face layer is composed of glass fiber. In some embodiments, the face layer is composed of glass fiber and rayon. In some embodiments, the face layer is composed of glass fiber and FR rayon. In some embodiments, the face layer is composed of glass fiber and cotton. In some embodiments, the face layer is composed of glass fiber and cellulosic fiber. In some embodiments, the face layer is composed of one or more of the combinations or blends of the foregoing materials.

In some embodiments, the back layer is composed of cotton. In some embodiments, the back layer is composed of bamboo. In some embodiments, the back layer is composed of rayon. In some embodiments, the back layer is composed of polyester. In some embodiments, the back layer is composed of nylon. In some embodiments, the back layer is composed of modal fabric. In some embodiments, the back layer is composed of lyocell semi-synthetic fibers. In some embodiments, the lyocell fibers are Tencel® brand of fibers. In some embodiments, the back layer is composed of micro-modal/lyocell. In some embodiments, the back layer is composed of polypropylene. In some embodiments, the back layer is composed of low density polyethylene. In some embodiments, the back layer is composed of a fire retardant (FR) polymer (poly). In some embodiments, the back layer is composed of high density polyethylene. In some embodiments, the back layer is composed of ultrahigh molecular weight polyethylene. In some embodiments, the back layer is composed of polymer/cotton. In some embodiments, the back layer is composed of bamboo/cotton. In some embodiments, the back layer is composed of polymer/bamboo. In some embodiments, the back layer is composed of lyocell/polymer. In some embodiments, the back layer is composed of glass fiber. In some embodiments, the back layer is composed of glass fiber and rayon. In some embodiments, the back layer is composed of glass fiber and FR rayon. In some embodiments, the back layer is composed of glass fiber and cotton. In some embodiments, the back layer is composed of glass fiber and cellulosic fiber. In some embodiments, the back layer is composed of one or more of the combinations or blends of the foregoing materials.

In some embodiments, the mattress cover covers an outer portion of the mattress core. In some embodiments, the mattress cover covers an outer surface area of the mattress core. In some embodiments, the mattress cover partially covers the outer surface area of the mattress core. In some embodiments, the mattress cover fully covers the outer surface area of the mattress core. In some embodiments, the mattress cover partially encapsulates the mattress core. In some embodiments, the mattress cover fully encapsulates the mattress core.

In some embodiments, the core is composed of foam. In some embodiments, the core is composed of polyurethane foam (polyfoam). In some embodiments, the core is composed of latex foam. In some embodiments, the core is composed of latex foam derived from 100% natural materials and/or synthetic blends. In some embodiments, the core is composed of any flexible polyurethane foam. In some embodiments, the core is composed of any natural or synthetic fibers. In some embodiments, the core is composed of foam having tradition or exotic chemistries. In some embodiments, the core is composed of memory foam (viscoelastic polyurethane foam, or low-resistance polyurethane foam (LRPu). In some embodiments, the core is composed of a hyper-elastic polymer material. In some embodiments, the core comprises air chambers. In some embodiments, the core is comprised predominantly of air chambers.

In some embodiments, the core comprises springs. In some embodiments, the core comprises coil springs. In some embodiments, the core comprises Bonnell coils. In some embodiments, the core comprises pocket coils. In some embodiments, the core comprises offset coils. In some embodiments, the core comprises continuous coils. In some embodiments, the core comprises a hair block, water bladder, air bladder, or resilient filling. In some embodiments, the core includes at least one layer. In some embodiments, the at least one layer includes a plurality of layers.

In some embodiments, the fabric of the mattress cover is configured to reduce consumption of the core when burned during 1633 testing, resulting in lower kW and Megajoules. In some embodiments, one or more of the inlay layer, the face layer and/or the back layer includes a structure, function, composition and/or features similar to one or more embodiments disclosed in U.S. application Ser. No. 17/971,386 entitled "Fire Retardant Fabric," published as U.S. Patent Application Publication No. 2023/0127723 on Apr. 27, 2023, which is incorporated by reference herein in its entirety. In some embodiments, the inlay layer, face layer and/or the back layer includes a structure, function, composition and/or features similar to one or more embodiments disclosed in U.S. Pat. No. 11,286,593 to Martin et al. entitled "Flame Retardant Mattress Core Cap and Method of Making Same" and U.S. Pat. No. 10,563,328 to Martin et al. entitled "Flame Retardant Mattress Core Cap and Method of Making Same," the contents of each of which is incorporated by reference in its entirety.

Figure 2:
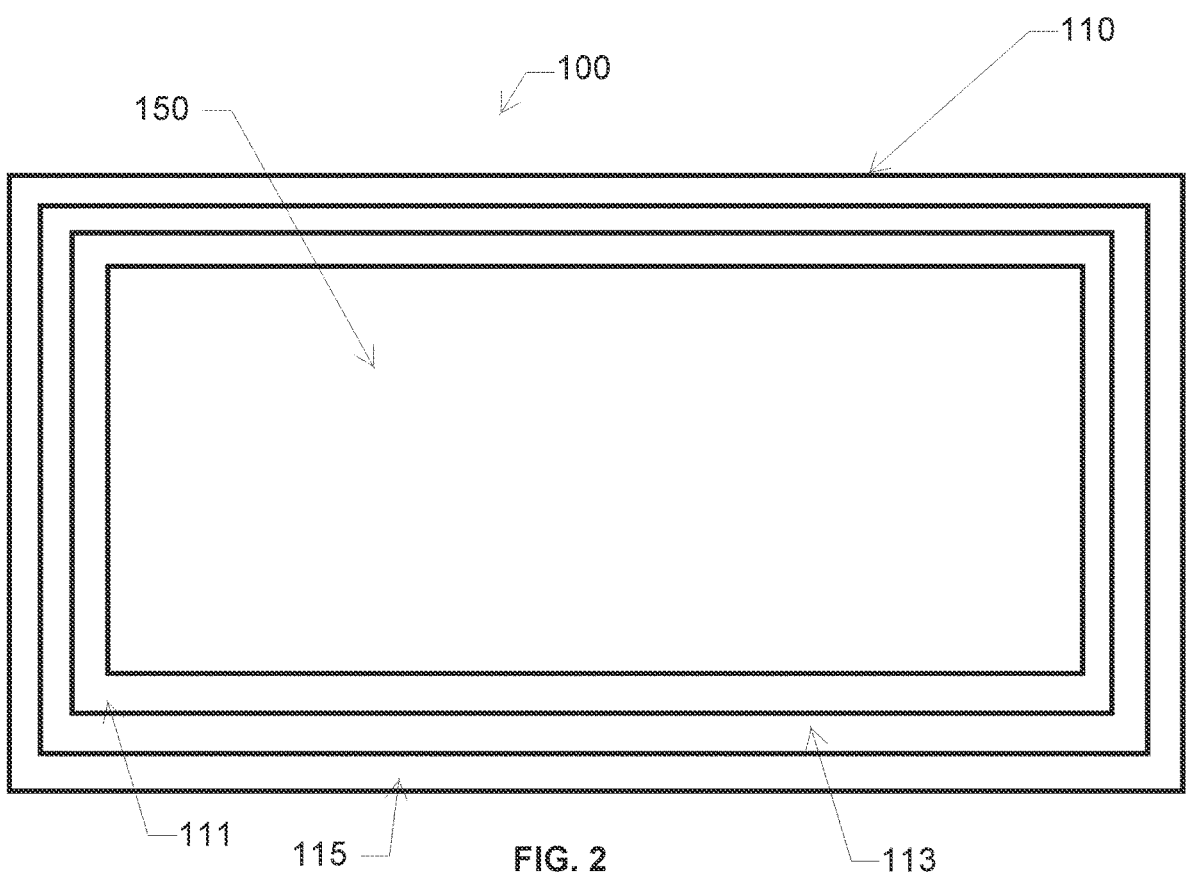
FIG. 2 is a cross-sectional view, taken along line II-II and looking in the direction of the arrows, of the mattress assembly of FIG. 1.

With reference to the figures, FIG. 1 is an isometric view of a mattress assembly (mattress) 100, including a mattress cover 110 covering a mattress core 150. In some embodiments, FIG. 2 is a cross-sectional view, taken along line II-II and looking in the direction of the arrows, of the assembly 100, the cover 110, and the mattress core 150, of FIG. 1. Referring to FIGS. 1 and 2, the mattress cover 110 includes at least three layers: a first, back layer 111; a second, face layer 115; and an inlay layer (inner layer) 113. In some embodiments, the inlay layer 113 is between the back layer 111 and the face layer 115. In some embodiments, the inlay layer 113 is encapsulated within or between the back layer 111 and the face layer 115.

In some embodiments, one, any or all of the back layer 111, the inlay layer 113, and the face layer 115 may be in accordance with the above description. In some embodiments, the mattress cover 110 is in accordance with the flame-retardant mattress cover described above.

In some embodiments, the back layer 111 may be the layer that is most adjacent (e.g., closest) to the mattress core 150. In some embodiments, the back layer 111 contacts at least a portion of the mattress core 150. In some embodiments, the back layer 111 is juxtaposed with the mattress core 150. In some embodiments, at least a portion of the face layer 115 may be adjacent a person resting on the cover 110 covering the mattress core 150.

Figure 3:
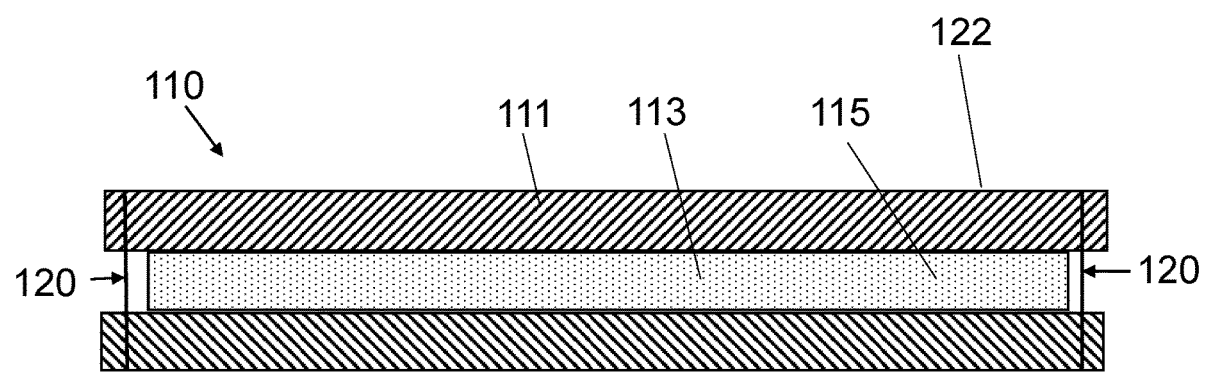
FIG. 3 is a schematic view of some embodiments of a fabric that may be employed by the mattress cover of FIG. 1.

Referring to FIGS. 2 and 3, in some embodiments, the inlay layer 113 is between the back layer 111 and the face layer 115. In some embodiments, at least one of the face layer 115 and the back layer 111 is composed of a knit fabric material. In some embodiments, both the face layer 115 and the back layer 111 are composed of a knit fabric material. In some embodiments, the face layer 115 and the back layer 111 are knit together. In some embodiments, the face layer 115 and the back layer 111 are stitched together by at least one or a plurality of stitching 120. In some embodiments, the face layer 115 is not knit, stitched, or attached to the inlay layer 113. In some embodiments, the back layer 111 is not knit, stitched, or attached to the inlay layer 113. In some embodiments, the back layer 111 and the face layer 115 are not knit, stitched, or attached to the inlay layer 113.

In some embodiments, at least one of the face layer 115 and the back layer 111 is composed of a woven fabric material. In some embodiments, both the face layer 115 and the back layer 111 are composed of a woven fabric material. In some embodiments, both the face layer 115 and the back layer 111 are woven together. In some embodiments, the face layer 115 is not woven with the inlay layer 113. In some embodiments, the back layer 111 is not woven with the inlay layer 113. In some embodiments, the face layer 115 and the back layer 111 are not woven with the inlay layer 113.

In some embodiments, the back layer 111 may cover the mattress core 150 directly; that is, there may be no additional layer disposed of the cover 110 disposed between the back layer 111 and the mattress core 150. In some embodiments, the cover 110 may include one or more additional layers (not shown) between back layer 111 and the mattress core 150.

In some embodiments, the face layer 115 may be the outermost layer of the cover 110; that is, there may be no additional layer of the cover 110 disposed on the face layer 115. In some embodiments, the cover 110 may include one or more additional layers (not shown) disposed on the face layer 115. In some embodiments, an outermost surface 122 of the face layer 115 is a sleep surface, namely, the external surface of the mattress that a user sleeps on, disregarding additional separate top of bed and sleep products, such as bed sheets, bed linens, mattress protectors, mattress pads, mattress toppers and pillows.

In some embodiments, the inlay layer 113 may directly contact either or both of back the layer 111 and the face layer 115; that is, without any additional layer disposed in the cover 110. In some embodiments, the cover 110 may include one or more additional layers (not shown) disposed between the inlay layer 113 and the back layer 111. In some embodiments, the cover 110 may include one or more additional layers (not shown) disposed between the inlay layer 113 and the face layer 115. In some embodiments, the cover 100 may include one or more additional layers (not shown) disposed between the inlay layer 113 and the back layer 113 and one or more additional layers (not shown) disposed between the inlay layer 113 and the face layer 115.

In some embodiments, a method includes one or more of the steps of:
 obtaining an inherently flame-retardant material;
 processing the inherently flame-retardant material, thereby to form an inlay layer of a cover for a bedding or sleep product
 obtaining a back layer;
 obtaining a face layer; and
 disposing the inlay layer between the back layer and the face layer, thereby to form a flame-retardant cover.
 Attaching the back layer to the face layer.

In some embodiments, the processing includes processing the inherently flame-retardant material with at least one of heat, water, or air. In some embodiments, the processing comprises processing the inherently flame-retardant material with at least two of heat, water, or air. In some embodiments, the processing comprises water texturing the inherently flame-retardant material. In some embodiments, the attachment step includes stitching. In some embodiments, the attachment step includes weaving. In some embodiments, the attachment step includes an adhesive.

In some embodiments, the mattress 100 is a crib mattress. In some embodiments, the mattress 100 is a portable crib mattress. In some embodiments, the mattress 100 is a small single mattress. In some embodiments, the mattress 100 is a twin mattress. In some embodiments, the mattress 100 is a twin XL mattress. In some embodiments, the mattress 100 is a full mattress. In some embodiments, the mattress 100 is a full XL mattress. In some embodiments, the mattress 100 is a queen mattress. In some embodiments, the mattress 100 is an Olympic queen mattress. In some embodiments, the mattress 100 is a king mattress. In some embodiments, the mattress 100 is a California king mattress. In some embodiments, the mattress 100 is an adult mattress. In some embodiments, the mattress 100 is a youth mattress. In some embodiments, the mattress 100 is a bunk bed mattress. In some embodiments, the mattress 100 is a futon. In some embodiments, the mattress 100 is a waterbed mattress or air mattress which contains upholstery material between the ticking and the mattress core. In some embodiments, the mattress 100 is any detachable mattresses used in any item of upholstered furniture such as convertible sofa bed mattresses, corner group mattresses, day bed mattresses, roll-a-way bed mattresses, high risers, and trundle bed mattresses.

In some embodiments, the invention described herein may be configured and applied to another type of bedding and/or sleep product. In some embodiments, pillow cover, a bed topper, a blanket, a duvet, or a comforter, for example, may have the structure of the disclosed flame-retardant mattress cover 110, including one or more of the disclosed back layer 111, the disclosed inlay layer 113, and/or the disclosed face layer 115.

Variations, modifications, and alterations to embodiments of the present disclosure described above will make themselves apparent to those skilled in the art. All such variations, modifications, alterations, and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation, or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A mattress cover, comprising:
   a first layer;
   a second layer; and
   an inlay layer,
   wherein the inlay layer is between the first layer and the second layer,
   wherein the inlay layer is composed of a flame-retardant material,
   wherein the first layer is attached to the second layer, and
   wherein the inlay layer is not attached to the first layer and the second layer.

2. The mattress cover of claim 1, wherein the first layer is a back layer, wherein the second layer is a face layer, and wherein the back layer is configured to be located closer to a mattress core covered by the mattress cover than the inlay layer and the face layer.

3. The mattress cover of claim 2, wherein the face layer is an outermost layer of the mattress cover.

4. The mattress cover of claim 3, wherein the inlay layer is composed of one or more of a cellulosic yarn, rayon yarn, viscose filament yarn, polyester, polypropylene, fire retardant poly, acrylic, nylon, synthetic bulking yarns, or combinations or blends thereof.

5. The mattress cover of claim 3, wherein the flame-retardant material comprises at least one of a continuous flame-retardant viscose staple fiber (FRVSF) or a micro-flame-retardant-viscose (micro-FRV) yarn.

6. The mattress cover of claim 3, wherein the flame-retardant material has a limiting oxygen index (LOI) from 14 to 45.

7. The mattress cover of claim 3, wherein at least one of the face layer and the back layer comprises at least one of a knit fabric material or a woven fabric material.

8. The mattress cover of claim 3, wherein each of the face layer and the back layer is composed of one or more of cotton, bamboo, rayon, polyester, nylon, modal fabric, lyocell, polypropylene, low-density polyethylene, high-density polyethylene, ultra-high density polyethylene, or combinations or blends thereof.

9. A mattress assembly, comprising:
   a core; and
   mattress cover,
   wherein the mattress cover covers at least a portion of the core,
   wherein the mattress cover includes
      a first layer,
      a second layer, and
      an inlay layer,
         wherein the inlay layer is between the first layer and the second layer,
         wherein the inlay layer is composed of a flame-retardant material,
         wherein the first layer is attached to the second layer, and
         wherein the inlay layer is not attached to the first layer and the second layer.

10. The mattress assembly of claim 9, wherein the first layer is a back layer, wherein the second layer is a face layer, and wherein the back layer is configured to be located closer to the core than the inlay layer and the face layer.

11. The mattress cover of claim 10, wherein the face layer is an outermost layer of the mattress cover.

12. The mattress assembly of claim 11, wherein the inlay layer is composed of one or more of a cellulosic yarn, rayon yarn, viscose filament yarn, polyester, polypropylene, fire retardant poly, acrylic, nylon, synthetic bulking yarns, or combinations or blends thereof.

13. The mattress assembly of claim 11 wherein the flame-retardant material comprises at least one of a continuous flame-retardant viscose staple fiber (FRVSF) or a micro-flame-retardant-viscose (micro-FRV) yarn.

14. The mattress assembly of claim 11, wherein the flame-retardant material has a limiting oxygen index (LOI) from 14 to 45.

15. The mattress assembly of claim 11, wherein at least one of the face layer and the back layer comprises at least one of a knit fabric material or a woven fabric material.

16. The mattress assembly of claim 11, wherein each of the face layer and the back layer is composed of one or more of cotton, bamboo, rayon, polyester, nylon, modal fabric, lyocell, polypropylene, low-density polyethylene, high-density polyethylene, ultra-high density polyethylene, or combinations or blends thereof.

17. The mattress assembly of claim 11, wherein the back layer contacts the core.

18. The mattress assembly of claim 9, wherein the core is composed of foam.

19. The mattress assembly of claim 9, wherein the face layer is stitched to the back layer, and wherein the inlay layer is not stitched to the face layer and the back layer.

20. Bedding, comprising:
   a core; and
   a cover,
      wherein the cover covers at least a portion of the core,
      wherein the cover includes
         a face layer,
         a back layer, and
         an inlay layer,
            wherein the inlay layer is between the face layer and the back layer,
            wherein the inlay layer is composed of a flame-retardant material,
            wherein the face layer is attached to the back layer, and
            wherein the inlay layer is not attached to the face layer and the back layer, and
            wherein the back layer is located closer to the core than the inlay layer and the face layer.

* * * * *